(12) United States Patent
Zimmermann et al.

(10) Patent No.: US 11,064,601 B2
(45) Date of Patent: *Jul. 13, 2021

(54) METHODS AND SYSTEMS FOR IMPLODING A LIQUID LINER

(71) Applicant: GENERAL FUSION INC., Burnaby (CA)

(72) Inventors: Joerg Zimmermann, Vancouver (CA); David Franklin Plant, Vanciyver (CA); Robert Vlastimil Bouchal, Surrey (CA); Troy Nickolas Tyler, Coquitlam (CA); Victoria Suponitsky, Coquitlam (CA); Michael Harcourt Delage, Vancouver (CA); Michel Georges Laberge, West Vancouver (CA); Malcolm Newton Williams, Ottawa (CA)

(73) Assignee: General Fusion Inc.

( * ) Notice: Subject to any disclaimer, the term of this patent is extended or adjusted under 35 U.S.C. 154(b) by 0 days.

This patent is subject to a terminal disclaimer.

(21) Appl. No.: 16/634,129

(22) PCT Filed: Apr. 16, 2018

(86) PCT No.: PCT/CA2018/050456
§ 371 (c)(1),
(2) Date: Jan. 24, 2020

(87) PCT Pub. No.: WO2018/201226
PCT Pub. Date: Nov. 8, 2018

(65) Prior Publication Data
US 2020/0236770 A1 Jul. 23, 2020

Related U.S. Application Data

(60) Provisional application No. 62/532,819, filed on Jul. 14, 2017, provisional application No. 62/492,776, filed on May 1, 2017.

(51) Int. Cl.
*H05H 1/02* (2006.01)
*H05H 1/24* (2006.01)
*H05H 1/54* (2006.01)

(52) U.S. Cl.
CPC ............... *H05H 1/02* (2013.01); *H05H 1/24* (2013.01); *H05H 1/54* (2013.01)

(58) Field of Classification Search
CPC ... H05H 1/02; H05H 1/24; H05H 1/54; G21B 3/00; G21B 3/006; G21B 3/008; G21B 1/05; G21B 1/11; G21B 1/13
See application file for complete search history.

(56) References Cited

U.S. PATENT DOCUMENTS 4,140,057 A 2/1979 Turchi et al.
4,217,171 A 8/1980 Schaffer
(Continued)

FOREIGN PATENT DOCUMENTS

CA 2 969 934 A1 7/2016

OTHER PUBLICATIONS

Laberge, Michel, "Acoustically driven magnetized target fusion", Journal of Fusion Energy, 27.1-2, (2008), pp. 65-68.
(Continued)

*Primary Examiner* — Amy Cohen Johnson
*Assistant Examiner* — Syed M Kaiser
(74) *Attorney, Agent, or Firm* — Knobbe, Martens, Olson & Bear, LLP

(57) ABSTRACT

Examples of systems for imploding liquid liner are described. The imploding system comprises a vessel and a rotating member positioned within the vessel. The rotating member has a plurality of shaped blades that form a plurality of curved passages that have an inboard opening at an inner surface and an outboard end at an outer surface. The rotating member is at least partially filled with liquid medium. A
(Continued)

driver is used to rotate the rotating member such that when the rotating member rotates the liquid medium is forced into the passages forming a liquid liner with an interface curved with respect to an axis of rotation and defining a cavity. The system further comprises an implosion driver that changes the rotational speed of the rotating member such that the liquid liner is imploded inwardly collapsing the cavity. The imploding liquid liner can be used in plasma compression systems.

19 Claims, 11 Drawing Sheets

(56) References Cited

U.S. PATENT DOCUMENTS

| | | | |
|---|---|---|---|
| 4,252,605 | A | 2/1981 | Schaffer |
| 7,380,974 | B2 | 6/2008 | Tessien |
| 7,425,092 | B1 | 9/2008 | Tessien |
| 7,448,792 | B2 | 11/2008 | Tessien |
| 9,271,383 | B2 | 2/2016 | Howard et al. |
| 10,569,007 | B2* | 2/2020 | Hobro .................. A61M 1/3413 |
| 2005/0129161 | A1 | 6/2005 | Laberge |
| 2008/0212398 | A1* | 9/2008 | Tessien .................... G21B 3/00 366/114 |
| 2011/0026658 | A1* | 2/2011 | Howard .................. H05H 1/02 376/133 |
| 2011/0182392 | A1* | 7/2011 | Wessel ..................... H05H 6/00 376/105 |
| 2012/0328066 | A1* | 12/2012 | Burke ...................... H05H 1/22 376/111 |
| 2015/0034164 | A1* | 2/2015 | Suponitsky .............. H05H 1/24 137/1 |
| 2019/0139650 | A1* | 5/2019 | Laberge ................... G21B 1/21 |
| 2020/0027572 | A1* | 1/2020 | Krasnoff .................. H05H 1/04 |

OTHER PUBLICATIONS

Turchi, Peter J., "Imploding liner compression of plasma: Concepts and issues", IEEE Transactions on Plasma Science, 36.1, (2008), pp. 52-61.

International Search Report and Written Opinion, International Application No. PCT/CA2018/050457, dated Jul. 5, 2018, in 6 pages.

International Search Report and Written Opinion, International Application No. PCT/CA2018/050456, dated Jul. 9, 2018, in 6 pages.

Itoh, Yasuyuki & Fujii-E, Yoichi, "Liquid Metal Liner Implosion Systems with Blade Lattice for Fusion", Journal of Nuclear Science and Technology, 17:3, (1980), pp. 167-178.

Itoh, Yasuyuki; Umezawa, Shigemitsu; Yamaoka, Nobuo & Fujii-E, Yoichi., "Collapsing Solid Potassium Liner Driven by Axial Magnetic Field", Journal of Nuclear Science and Technology, 17:8, (1980), pp. 573-581.

Extended International Search Report, International Application No. PCT/CA2018/050456, dated Jul. 12, 2020, in 6 pages.

* cited by examiner

METHODS AND SYSTEMS FOR IMPLODING A LIQUID LINER

CROSS-REFERENCE TO RELATED APPLICATIONS

This application is the U.S. National Phase under 35 U.S.C. § 371 of International Application No. PCT/CA2018/050456, filed Apr. 16, 2018, designating the United States and published in English on Nov. 8, 2018 as WO2018/201226, and which claims priority to U.S. Provisional Appl. No. 62/492,776, filed May 1, 2017 and U.S. Provisional Appl. No. 62/532,819, filed Jul. 14, 2017.

TECHNICAL FIELD

The present disclosure generally relates to methods and systems for forming a cavity in a liquid medium and collapsing such cavity by imploding a liquid liner of the cavity.

BACKGROUND

Imploding liquid liner systems, as known in the prior art, form a cylindrical cavity that is collapsed by radially imploding a cylindrically shaped liquid liner. An example of such a prior art imploding liquid liner system is LINUS system that was developed in the US Naval Research Laboratory in the 1970s. In the LINUS system a rotating cylindrical liquid metal liner is driven radially by free-pistons. The pistons are driven by a high pressure gas axially causing radial motion of the free-surface of the rotating liquid liner. The initial rotation of the liquid metal is provided by rotating the cylindrical vessel in which the liquid medium is contained. The entire vessel is rotated about its longitudinal axis, so that a cylindrical cavity is formed along and coaxial with the axis of rotation.

SUMMARY

In one aspect, a liquid liner implosion system for forming a cavity in a liquid liner and collapsing the cavity by imploding the liquid liner is provided. The system comprises a vessel with an outer wall, a rotating member that is placed inside the vessel and is rotatable about a rotation axis, a rotational driver that is operationally coupled to the rotating member to rotate the rotating member, a liquid medium flowing in the rotating member forming a liquid liner when the rotating member is rotating and an implosion driver that is engageable with the rotating member to change the acceleration of the rotating member and cause the liquid liner to implode towards a central region of an interior volume of the rotating member to collapse the cavity. The rotating member comprises a first end and a second end formed along the rotation axis, an inner surface that curves with respect to the axis of rotation and a plurality of curved passages. Each of the curved passages has an inboard opening at the inner surface and an outboard end. A curvature of each of the passages is a function of a distance between the outboard end of the passage and the first or the second ends, such that the passages with an outboard end in a vicinity of the first or the second ends curve in three dimensions from the outboard end to the inboard opening in a direction towards the central region.

The rotating member further comprises a plurality of shaped blades that are spaced apart and form the plurality of shaped passages. At least some of the plurality of the shaped blades have tapered walls at the inboard openings.

In one aspect, the outboard ends of the rotating member are opened and an outer surface of the rotating member is shaped according to an equation $$P_{out(top)} + \rho g(z_0 - z) = P_{in} + \rho \omega^2 \int_{r_i(z)}^{r_o(z)} r\, dr$$

where $P_{out(top)}$ is a pressure at the outer surface at the first end of the rotating member; $P_{in}$ is a pressure at the inner surface of the rotating member; $z_o$ is a reference point at the inner surface; z is a variable distance along the axis of rotation; $\rho$ is a density of the liquid medium; g is an acceleration due to gravity along the rotation axis of the rotating member; $\omega$ is rotational speed in rad/s of the rotating member; r is a variable perpendicular distance from the rotation axis; $r_o(z)$ is a function defining a radius of the outboard opening of each of the passages from the rotation axis and $r_i(z)$ is a function defining a radius of the inboard opening of each of the passages from the rotation axis.

In one aspect, the implosion driver is a decelerator that comprises an eccentric gear assembly with a toothed hollow gear ring and a plurality of planetary gears each having a plurality of teeth at its circumference. The plurality of planetary gears are positioned between the rotating member and the gear ring. The rotating member also comprises teeth projecting toward the planetary gears such that at least some of the teeth of the planetary gears engage at least some of the teeth of the rotating member and at least some of the teeth of the gear ring. Each of the planetary gears further comprises an eccentric mass. A lock is configured to lock the planetary gears in a locked position relative to the rotating member at the beginning of an operation, such that the eccentric mass of each planetary gear is offset with respect to the rotating member when in the locked position. When the lock is released the planetary gears spin in the direction of rotation thereby decelerating the rotating member and accelerating the hollow gear ring.

In another aspect, the implosion driver includes an accelerator selected from a group consisting of a chemical driver, an electromagnetic driver, a pneumatic driver, a hydraulic driver, or a combination thereof.

In one aspect, a plasma compression system comprising the liquid liner implosion system is provided. The vessel and the rotating member further have an opening that are aligned and that fluid communication with the interior volume and the inboard openings of the plurality of curved passages. The plasma compression system comprises a plasma generator that is configured to generate plasma and has an outlet connected to the opening in the vessel such that plasma generated by the plasma generator is injected into the cavity. When the liquid liner is imploded to collapse the cavity it compresses the plasma in the cavity.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

Figure 1:
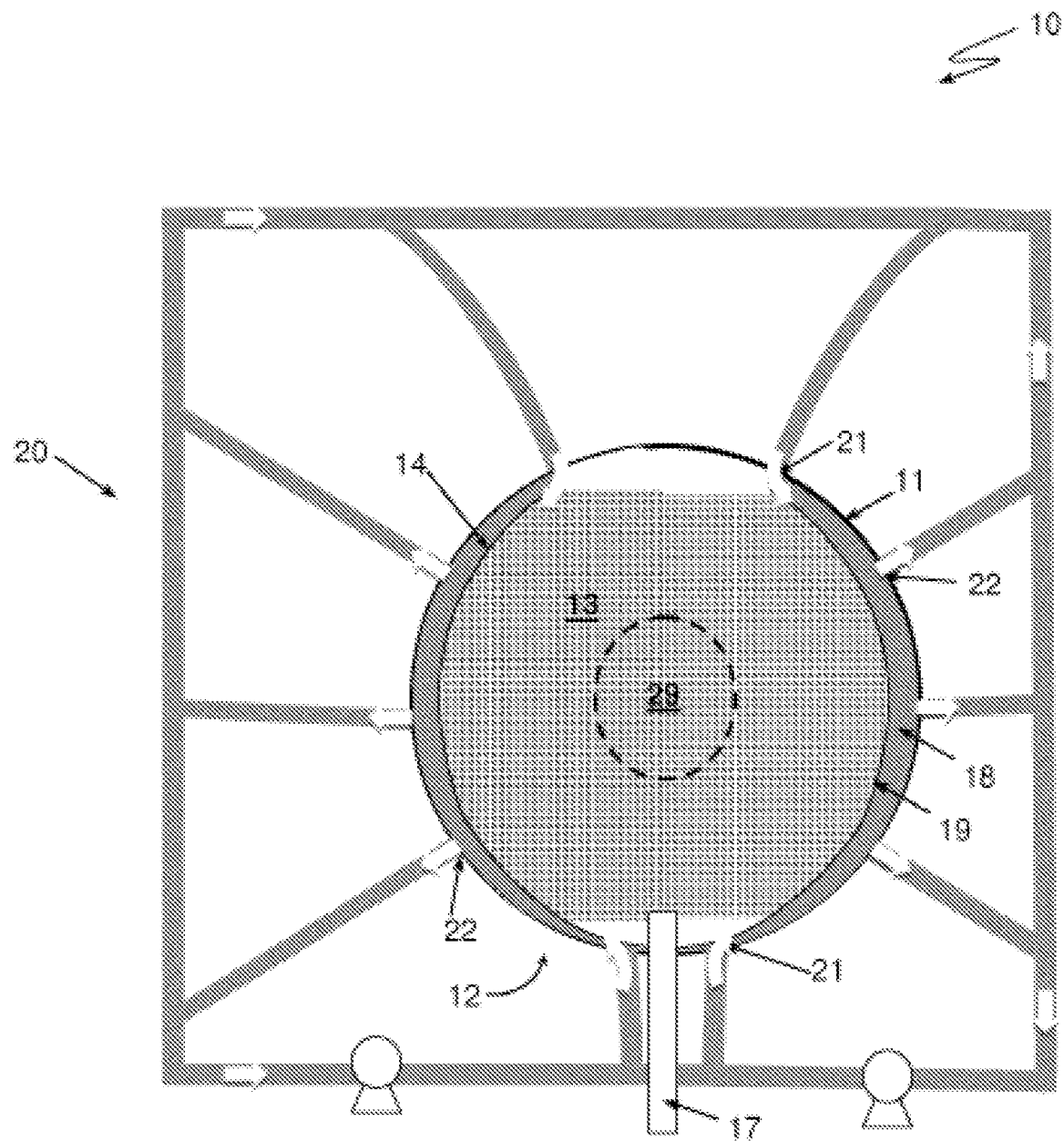
FIG. 1 is a schematic cross-sectional side view of an example of a liquid liner implosion system for forming a liquid liner with a rotating inner interface curved inwardly towards an axis of rotation, and for imploding the liquid liner.

FIG. 1 illustrates an example of a liquid liner implosion system 10 for forming and imploding a liquid lined cavity 13. The system 10 comprises a vessel 12 that has a wall 11 and a rotating member 14 that is placed inside the vessel 12 and is rotatable about an axis of rotation. The rotating member 14 comprises a plurality of shaped blades 15 such that a number of curved channels/passages 16 are formed between the blades 15 (see FIG. 2) and an interior volume is defined inside the rotating member 14. The rotating member 14 can be partially filled with a liquid medium such that the liquid medium can at least partially fill the passages 16 when the rotating member 14 rotates. The liquid medium can be a liquid metal such as liquid lithium or liquid lead/lithium alloy, or any other fluid, alloy or a combination thereof suitable to form a liquid liner when the rotating member 14 is rotated. A rotational driver is coupled to the rotating member 14 to rotate the rotating member 14, such that the liquid medium is driven circumferentially and is constrained latitudinally, forming a liquid liner 18 with a rotating inner interface 19. The liquid liner 18 defines the cavity 13. The rotational driver can, for example, comprise a rod 17 connected to at least one part of the rotating member 14, and a power source (not shown) in communication with the rod 17 to rotate the rotating member 14. In an alternative embodiment, the rotational driver can be configured to rotate the vessel 12, such that when the rotational driver is triggered to spin the vessel 12, fluid friction of the liquid medium between the vessel 12 and the rotating member 14 will spin the rotating member 14 to the same speed as the vessel 12.

A liquid circulating system 20 can be provided to direct the flow of the liquid medium in the system 10. The circulating system 20 can comprise plurality of valves, nozzles, pipe-network and one or more pumps to get the desired flow of liquid medium in the rotating member 14. The circulation system 20 further comprises one or more injection ports 21 to inject the liquid medium into the rotating member 14 and one or more draining ports 22 to drain the liquid medium out of the rotating member 14 and the vessel 12. For example, the injection ports 21 can be formed in proximity to the poles of the vessel 12 while the draining ports 22 can be at the equator of the vessel 12 or at various latitudes near the equator. In one embodiment, a flow control may be provided at the injection/drain ports 21, 22 to control fluid flow through the ports.

Figure 2:
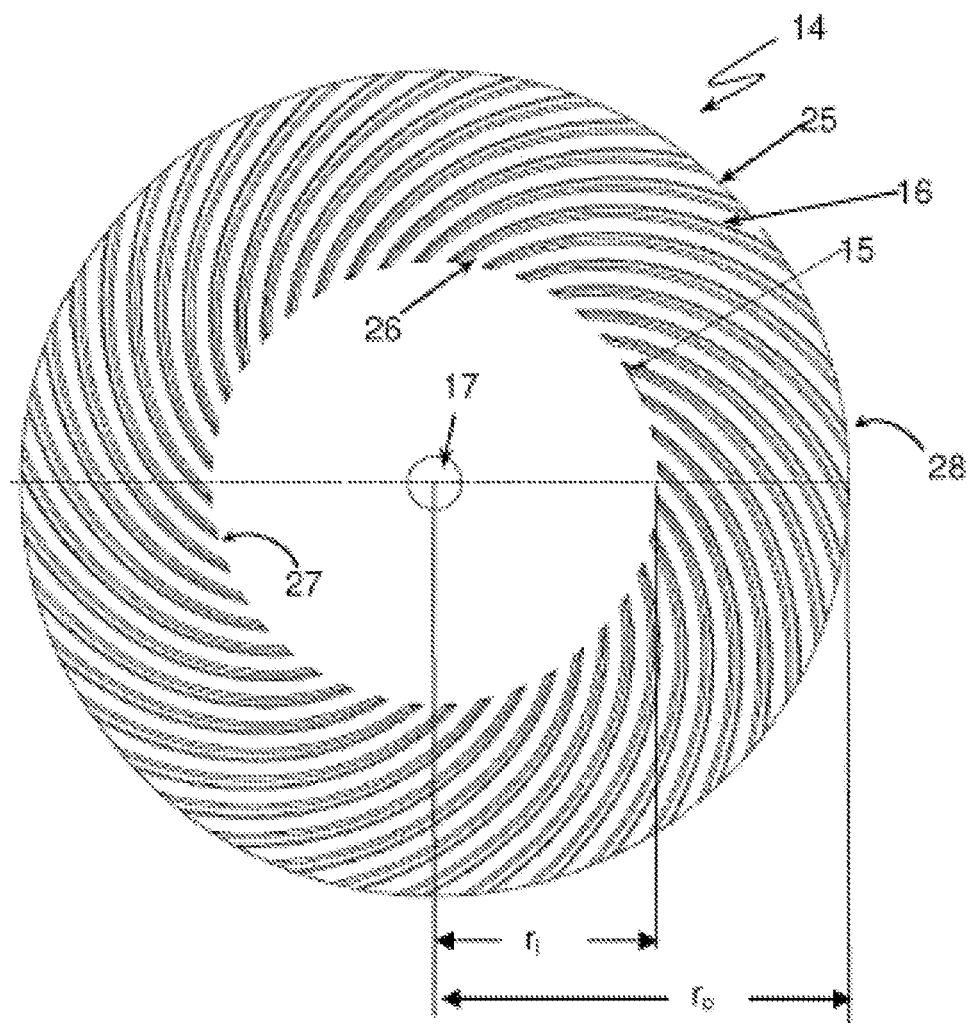
FIG. 2 is a top cross-sectional view of a rotating member of the liquid liner implosion system, showing a plurality of shaped blades forming curved channels/passages.

The rotating member 14 can be placed within the vessel 12. FIG. 2 illustrates an equatorial cross-section of the rotating member 14 showing the plurality of shaped blades 15 forming the channels/passages 16. Each of the passages 16 has an inboard end 26 at an inner surface 27 of the rotating member 14 and an outboard end 25 at a back (outer) surface 28 of the rotating member 14. The inner surface 27 of the rotating member 14 is coaxial with the axis of rotation and defines the inner radius r of the rotating member from the axis of rotation while the outer surface 28 defines the outer radius $r_o$ of the rotating member 14 from the axis of rotation. The plurality of passages 16 can be opened at least to the inner surface 27 of the rotating member 14 forming the passages' outlet. At least some of the blades 15 can have tapered/chamfered walls at the inboard end 26. The rotating member 14 can have a first end 23 at a top pole (see FIG. 7A) and a second end 24 at a bottom pole of the rotating member 14. The inner surface 27 of the rotating member 14 curves with respect to the axis of rotation such that a part (or parts) of the inner surface 27 can curve inwardly towards the axis of rotation while other part(s) can curve outwardly with respect to the axis of rotation (further away from the axis of rotation). The Figures show embodiments of a rotating member 14 where the inner surface 27 curves inwardly towards each of the first and second ends 23, 24 (spherically shaped inner surface 27); however persons skilled in the art would understand that the inner surface can have other curving shapes such as a convex shape (curving outwardly at each of the first and the second ends 23 and 24) or other waving shapes, without departing from the scope of invention. The passages 16 can be curved such that the inboard end 26 is at a pre-determined angle with respect to the outboard end 25. In one implementation, the passages 16 can be closed at the outboard end 25 meaning that the back of the passages 16 is closed with a solid wall, with the injection and draining ports 21/22 formed in such solid wall to allow liquid medium flowing in and out of the rotating member 14. For example, the back end of the blades 15 can be connected to the wall 11 of the vessel 12 such that the wall 11 of the vessel 12 forms the outer wall of the rotating member 14. In such implementation, the vessel 12 will rotate along with the rotating member 14. In one embodiment, the outer wall of the rotating member 14 can be separate from the wall 11 of the vessel 12, and the vessel 12 can be stationary during rotation of the rotating member 12. In another implementation, the channels/passages 16 can be opened at both ends 25 and 26, so such rotating member 14 will have no outer wall. The rotating member 14 can be positioned within a stator that is stationary and encloses the rotating member 14. For the purpose of this application, the stator means a non-rotating component within which the rotating member 14 rotates and forms the cavity 13 and the liquid liner 18. The stator can be separate from the vessel 12 such that an assembly of the stator enclosing the rotating member 14 can be positioned within the vessel 12. In one embodiment, the stator can be connected to the vessel 12 forming a single structural element and the rotating member 14 can be positioned within the vessel 12, such that the vessel 12 is the stator.

The rotating member 14 can be a single member or it can be made of two of more parts interlocked together forming the rotating member 14. For example, the rotating member 14 can have a number of latitudinal parts that are spaced along the rotation axis and can be stacked and nested one to another forming the rotating member 14. Each of the latitudinal parts includes a whole length of the shaped blades 15 such that when the parts are interlocked the curvature of the blades of one part are interlocked within the blades of the neighboring part. Thus, each of the latitudinal parts comprises a number of shaped blades and each of the shaped blades in each of the latitudinal parts has an uninterrupted length. Each of the parts can rotate independently to adjust the parameters of the liquid liner 18. The plurality of interlocking parts can rotate at different speeds to adjust the geometry of the liquid liner 18 or the geometry of the collapse of the liquid liner 18.

The liquid being spun by the rotating member 14 is forced against the closed outer wall of the rotating member 14 or in some implementations against the wall 11 of the vessel 12 (or the wall of the stator) creating the cavity 13 and the liquid liner 18. The blades 15 can be inclined such that the liquid's momentum carries the liquid inward if the rotating blades are stopped, decelerated, rapidly accelerated or reverse the direction of their rotation. The shape and inclination of the blades 15 can vary, for example, the inboard end 26 of the passages 16 can be more inclined toward the inner cavity 13 or less without departing from the scope of the invention. The blades 15 can be arranged for a counterclockwise or for a clockwise rotation without departing from the scope of the invention. The mass of the rotating member 14 can be kept low to reduce its inertia in order to be able to decelerate/accelerate the rotating member 14 within a short time period. For example, a rotating member 14 with no outer wall (opened outboard ends 25), or a rotating member with blades with thinner walls, would reduce the mass of the rotating member 14 and thus the inertia of the rotating member 14, so such rotating member could be decelerated faster.

Figure 3:
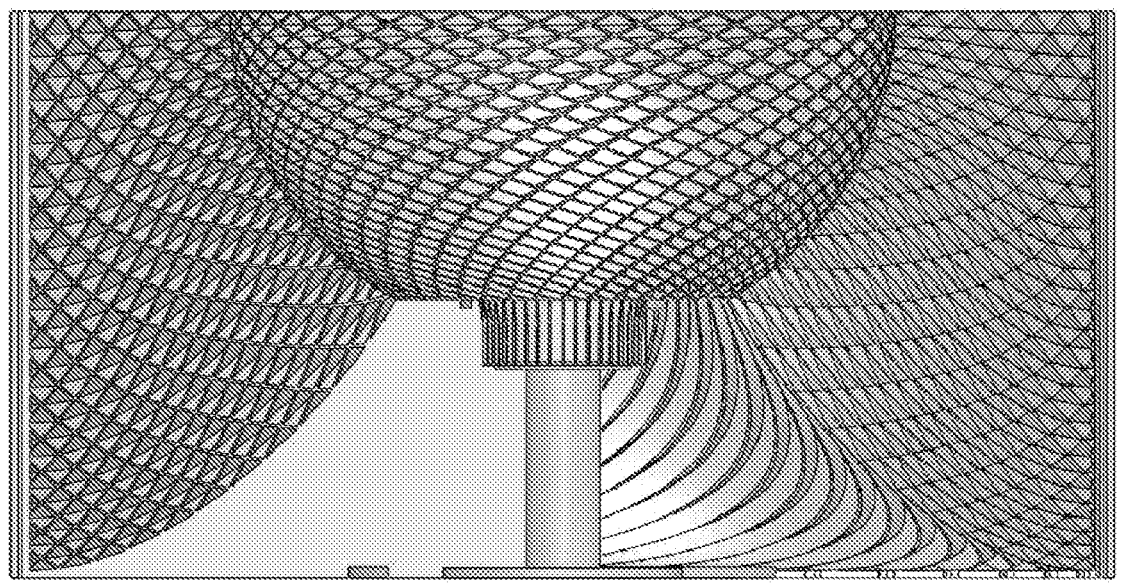
FIG. 3 is a partial cross-sectional side view of a lower portion of one embodiment of the rotating member with a spherically shaped inner surface and a cylindrically shaped outer surface, and showing the arrangement and geometry of blades at one end of the rotating member.

FIG. 3 illustrates one embodiment of a rotating member 14 having a spherically shaped inner surface and a cylindrically shaped outer surface, and in particular, shows an arrangement and geometry of the blades at a pole of the rotating member 14. To produce a spherical inner shape, the blade's shape and the passages' curve change with latitudinal position, such that the blades 15 and passages 16 can be more twisted as they approach the poles of the rotating member 14. The curvature of the passages 16 is a function of the distance between the outboard end 25 from the first or the second ends 23, 24 such that the curvature of the passages 16 in vicinity to the first and the second ends 23, 24 curves in three dimensions from the outboard end 25 to the inboard end 26 towards a central region 29 of the interior volume. For example, the blades 15 and the passages 16 at the equator of the rotating member 14 curve in two dimensions (e.g. X and Y) while the blades 15 and passages 16 away from the equator (e.g. at the ends 23, 24) curve in three dimensions (X, Y, Z) such that the inner surface 27 of the rotating member 14 is curved inwardly towards the first and second ends 23, 24. In addition, the length, width, height and/or the angle of the curve of the passages 16 can vary, such as for example, the passages 16 closer to the first and second ends 23, 24 may be narrower, longer and/or more twisted than the passages 16 further away from the first and second ends 23, 24.

The rotating member 14 can further comprise an entrance opening 30 (see FIG. 7A) formed at the first end 23 or the second end 24 of the rotating member 14. An entrance opening 30 can be formed on one or both ends 23, 24 of the rotating member 14 without departing from the scope of the invention. The number, shape, size, length, radial depth of the blades 15, as well as the volume of the passages 16 can vary depending on the size and shape of the rotating member 14, the shape and size of the vessel 12 (or in some implementation stator) and the desired parameters of the liquid liner 18. The shape of the rotating member 14, such as its inner surface and its outer surface can be curved, for example, the inner surface can be spherical or oblate (egg-shaped) or any other suitable shape or combination thereof and the outer surface can be cylindrical or oblate or any other suitable shape or combination thereof without departing from the scope of the invention.

Figure 4:
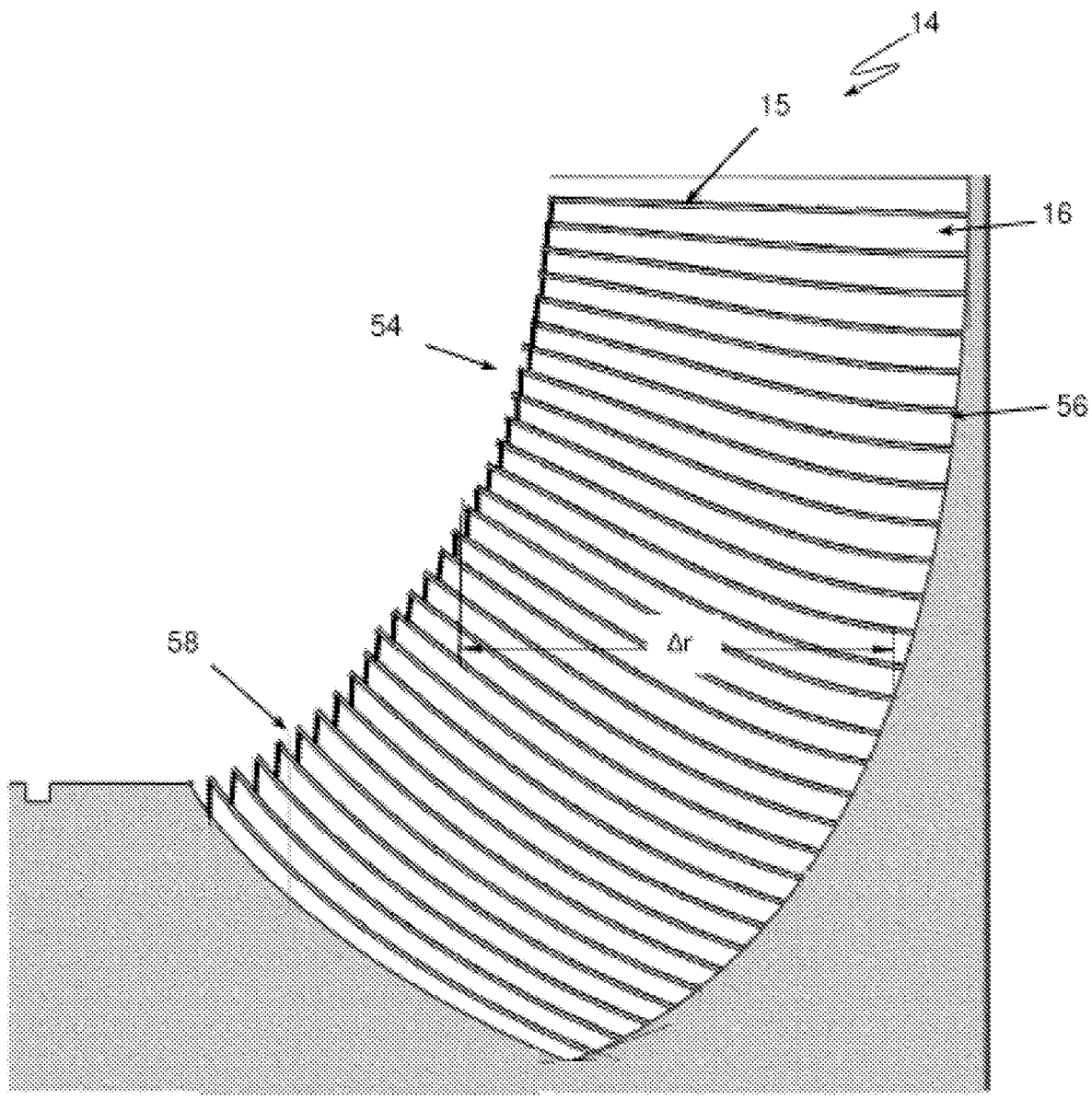
FIG. 4 is a partial cross-sectional side view of another embodiment of a rotating member with an oblate shaped outer surface and a spherically shaped inner surface.

FIG. 4 illustrates a cross-sectional view of a lower portion of another embodiment of the rotating member 14, having an oblate outer wall 56 and a curved (spherical) inner surface 54. The passages 16 can be closed at the back end forming an outer wall 56 and opened at the inner surface 54. The rotating member 14 is partially filled with a liquid medium and when the rotating member 14 spins, the liquid is forced into the passages 16 against the closed outer wall 56 of the rotating member 14, filling the passages 16. Since the back of the rotating member 14 is closed, a liquid liner forms an interface 58 in each of the passage 16. The multiple interfaces 58 form a step-like curved interface of the liquid liner 18 that defines the cavity 13. The curvature of the liquid liner interface can be smoothed by increasing the number of passages 16, thereby decreasing the size of each step. Also, as the diameter of the passages 16 is reduced, surface tension can also be utilized to smooth the curvature of the liquid liner interface 58 (depending on the material used to build the rotating member 14).

In some implementations, the outboard ends of the passages 16 are open to an outer surface 56 of the rotating member 14, such that the passages 16 are opened at both ends. In such implementations, the shape of the liquid liner interface 19/58 can be controlled and adjusted by controlling the pressure at the back (outer) surface 56 of the rotating member 14. In operation, the pressure along the outer surface 56 is kept close to uniform in order to form a liquid liner 18 with a desired inner interface 19. In embodiments where the outer surface 56 of the rotating member is opened, the shape of the outer surface 56 can be determined according to the equation:

$$P_{out(top)} + \rho g(zo - z) = Pin + \rho \omega^2 \int_{ri(z)}^{ro(z)} r \, dr \quad (1)$$

where $P_{out(top)}$ is a pressure at the outer surface 56 at the first (top) end 23 and is a design input; $P_{in}$ is a pressure at the inner surface 54 of the rotating member 14 and is defined by the substance contained in the cavity 13, i.e. gas, plasma, magnetic field, etc.; $z_o$ is a reference point at the inner surface 54; z is a variable distance along the axis of rotation; ρ is a density of the liquid medium; g is an acceleration due to gravity along the axis of rotation of the rotating member 14; ω is rotational speed in rad/s of the rotating member 14; r is a variable perpendicular distance from the axis of rotation; $r_o(z)$ is a function defining the radius of the outboard end 25 of the passages 16 from the axis of rotation and $r_i(z)$ is a function defining the radius of the inboard end 26 of the passages 16 from the axis of rotation. Persons skilled in the art would understand that for systems that are not vertically oriented (e.g. tilted, horizontally oriented) the equation (1) should be adapted to account for the offset of the gravitational vector from the axis of rotation.

According to equation (1), the outer surface 56 (when the passages 16 are opened at the outboard end) is shaped such that a change of radius Δr of the channels/passages 16 at the ends 23, 24 is bigger than the change of radius Δr of the passages 16 at the equator. Δr is defined as a difference between a radius of the outboard end 25 of the passages 16 from the axis of rotation and a radius of the inboard end 26 of the passages 16 from the axis of rotation. Thus, Δr gradually decreases from the ends 23, 24 toward the equator of the rotating member 14. One should be aware that there can be a small pressure gradient at the outer surface 56 of the rotating member 14 due to the gravity. However, in a rotational system, such pressure gradient is small since the gravitational acceleration is much smaller than the angular acceleration. That being said, in smaller sized systems in which the pressure is smaller, the slight pressure gradient may influence the curvature of the liquid liner interface. In order to compensate for the pressure gradient due to gravity, the rotating member 14 where the first end 23 is above the second end 24 can be asymmetric about an equatorial plane, such that for example, the Δr at the first (top) end 23 can be smaller than the Δr at the second (bottom) end 24 for spherically shaped inner surface.

The liquid liner can be imploded inwardly by an implosion driver. For example, the blades 15 can be arranged such that if they are stopped or rapidly decelerated or rapidly accelerated by the implosion driver, the momentum of the liquid in the channels/passages 16 forces the liquid inward toward a central region 29 of the cavity 13. Consequently, the rotational kinetic energy of the spinning liquid is in part converted into useful work to implode the liquid liner 18. The arrangement of the blades 15, their shape, length, radial depth and the volume of the passages 16 define and shape the implosion, compressing any substance contained in the cavity 13 (e.g. gas, plasma, magnetic field, etc.). For example, changing the angle of the blades 15 can change the final compression radius and the compression time. The passages' diameter can be varied as the blade's angle is varied in order to maintain consistent wall thickness of the passages 16. In some embodiments, the blade's angle can be k=0.085 d($R_i$ blades)/dθ, where k is a slope in radial direction, d is a differential operator, $R_i$ is the inner radius of the blades 15 and dθ is the blades' angle in radians.

Another factor affecting the compression rate is the ratio of the outer to inner radius $r_o/r_i$ of the rotating member 14. Increasing the outer radius $r_o$ increases the total compression; however that will increase the inertia of the rotating member 14. In some embodiments, and due to the spherical shape of the inner surface of the rotating member 14 in this embodiment, the liquid liner sections near the ends 23, 24 may collapse faster and decrease the symmetry and/or the smoothness of the liquid liner interface 19 during collapse/compression. By varying the outer radius of the rotating member 14 such that it is a constant multiple of the inner radius the rotating member 14 will have a geometry where the liquid medium in the equatorial channels (passages 16) collapses at the same time as the liquid medium in the channels closer to the ends 23, 24. In some embodiments, the rotating member 14 is provided with passages with varying volume. For example, the volume of the passages 16 with their outboard ends nearer the poles (ends 23, 24) may be smaller than the volume of the passages 16 with their outboard ends further away from the ends 23, 24 and closer to the equator, such that during collapse of the liquid liner 18, the shape of the liquid liner interface is maintained.

In some implementations, the shape of the liquid liner 18 during compression can be adjusted by providing a rotating member 14 with multiple latitudinal parts that can separately rotate, then operating the system so that the latitudinal parts rotate at different pre-determined rates. For example, in cases where the rotating member 14 is made of two or more latitudinal parts, each part can be rotated separately and independently from the other(s). The desired shape of the liquid liner as it collapses can be achieved by adjusting the speed of each latitudinal part of the rotating member 14 or by providing a rotating member 14 with a geometry having the required ratio of the outer to inner radius and required volume of the channels/passages 16. The required ratio will depend on the desired size of the rotating member 14 and the pre-determined compression ratio.

Figure 5:
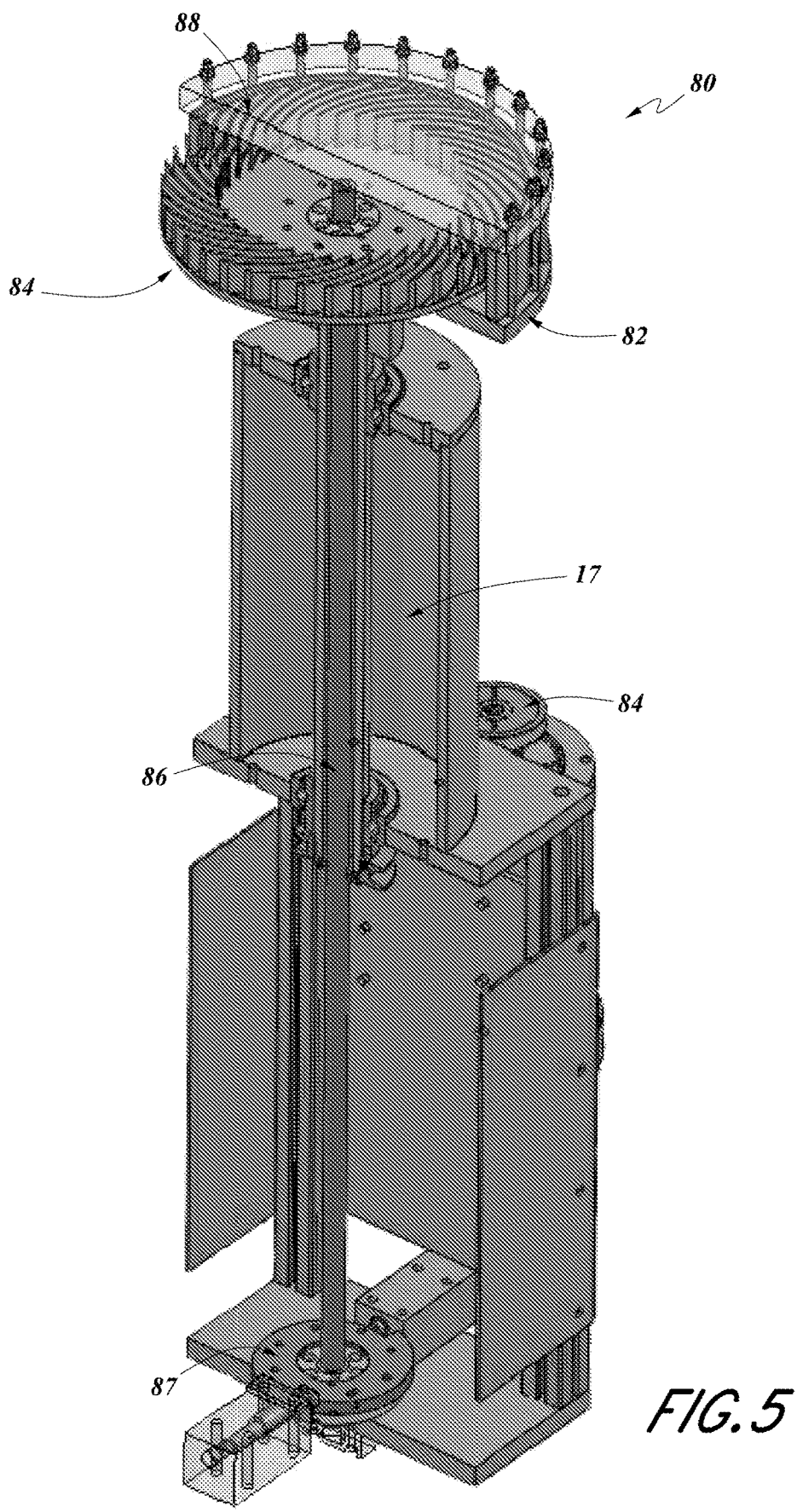
FIG. 5 is a perspective cross-sectional view of an experimental model of a liquid implosion system with another embodiment of a rotating member, with cylindrically shaped inner and outer surfaces.

FIG. 5 shows an experimental, small, model of a liquid liner implosion system 80. This system 80 comprises a rotating member 84 according to another embodiment, wherein the inner surface and outer surface of the rotating member 84 is cylindrical ("cylindrical rotating member"). The cylindrical rotating member 84 contains a liquid and can be rotated to form a liquid liner 88 with interface 89 (see FIG. 6A). The rotating member 84 is placed within a vessel 82. In the illustrated model, the vessel 82 is connected to the driving rod 17 which is driven by a motor 84 (e.g. an electric motor). When the motor is triggered to spin the vessel 82, fluid friction of the liquid medium between the vessel 82 and the rotating member 84 will spin the rotating member 84 to the same speed as the vessel 82. The rotating member 84 is filled with a pre-determined amount of the liquid medium before the motor is triggered to spin the vessel 82. To stop the rotating member 84 a shaft 86 is used to apply deceleration force to slow down the rotating member. As an example only, one end of the shaft 86 can be connected to the rotating member 84 while an opposite end can be a two tooth ratchet 87. To stop/decelerate the rotating member 84, gas actuated pins can be pushed into the ratchet 87 stopping the ratchet 87 and the lower portion of the shaft 86 acts as a torsion spring that twists to absorb the energy of the rotating member 84. The experimental model is provided with a transparent, top window 88, to allow recording of the formation of the liquid liner 88 and its behavior during implosion, with a high speed camera. Blue dye was added to the liquid medium to enhance the visibility of the inner surface.

Figure 6A:
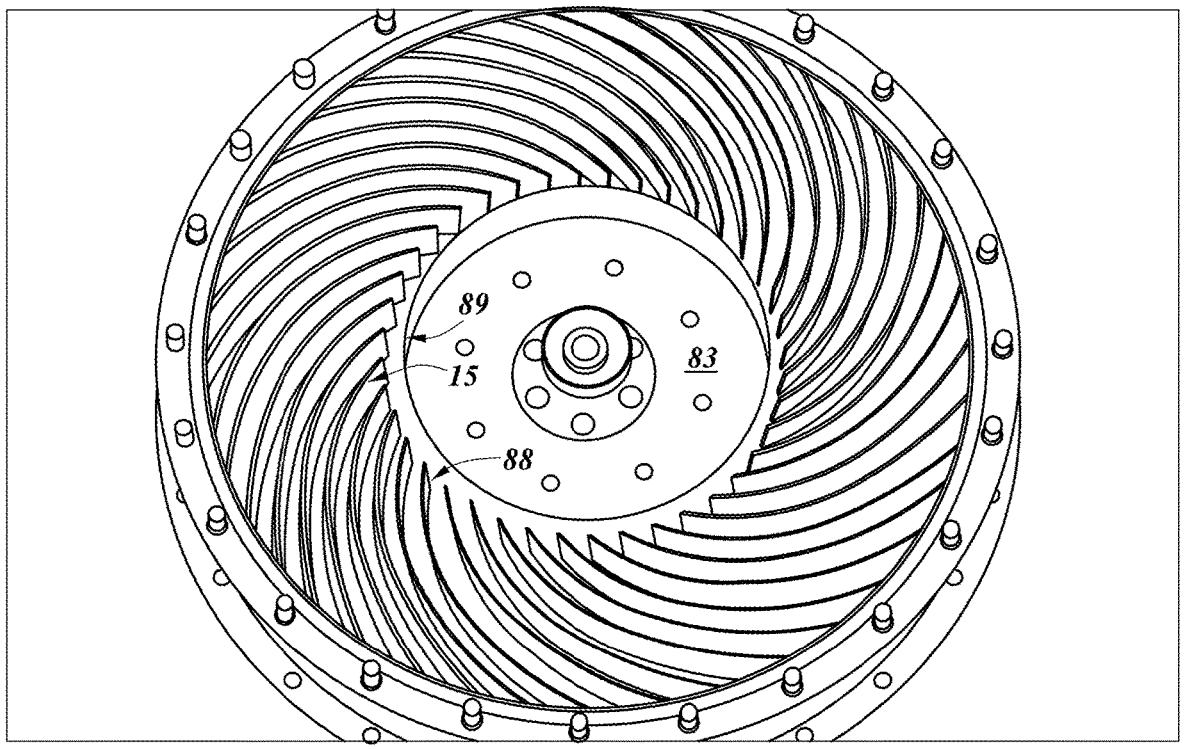
FIG. 6A is a top view of the experimental model of the liquid liner implosion system showing the liquid liner formed at a distance radially inwards from an interior tip of the blades of the rotating member before the liquid liner's implosion.
Figure 6B:
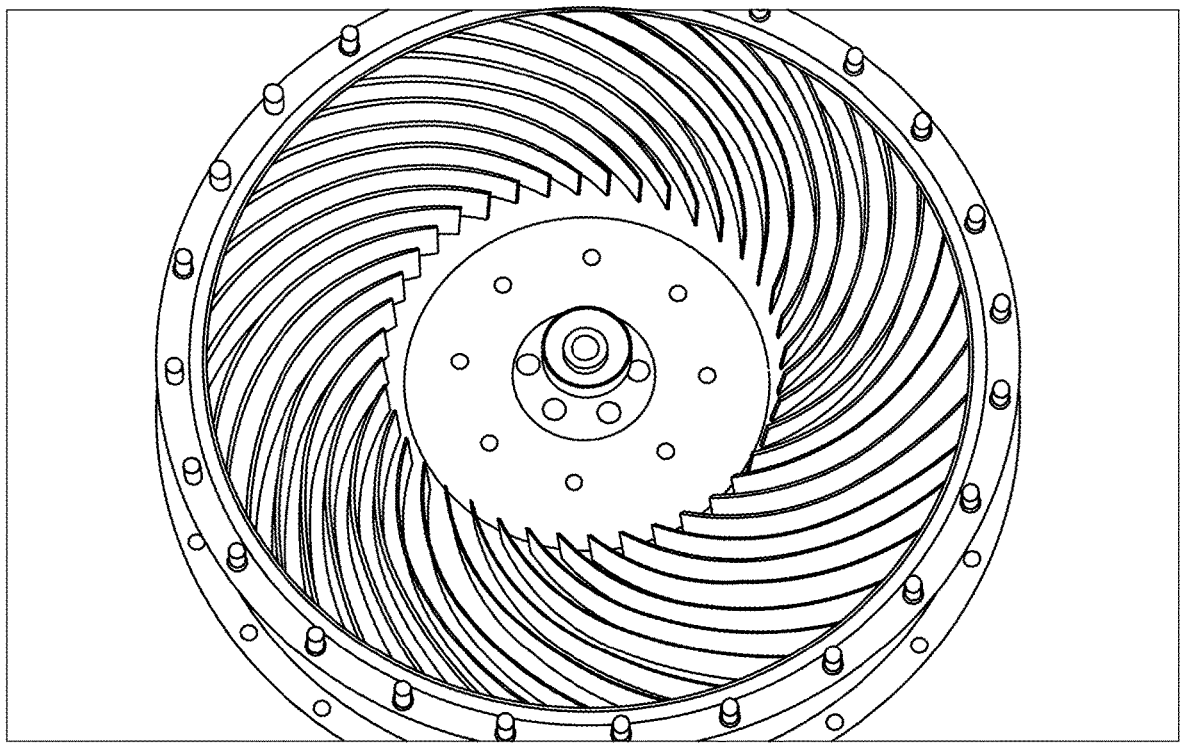
FIG. 6B is a top view of the experimental model of FIG. 6A showing the liquid filling an interior volume of the rotating member after the liquid liner's implosion.

FIG. 6A shows the liquid liner 88 with a rotating interface 89 formed inward from the tip end of the blades 15. The size of the liquid liner 88, i.e. the radial depth of the layer of the liquid liner 88 relative to the inner surface of the rotating member 84, depends on the amount of a liquid medium in the vessel 82. As shown in FIG. 6A, the formed liquid liner 88 has a smooth rotating interface 89. By decelerating the rotating member 84, the momentum of the liquid between the arrested passages 16 launches the liquid inward toward the central region of the cavity 83, collapsing the liquid liner into the cavity 83. FIG. 6B shows the interior of the rotating member 84 filled with the liquid medium after the implosion (compression). As the liquid liner implodes, the liner hits the shaft 86, and the compression is stopped by the shaft 86 at a radial compression ratio of 7.7. The liquid layer interface 89 was smooth during the collapse. As shown in FIGS. 6A and 6B, a liquid liner 88 with a smooth rotating interface 89 can be obtained using the cylindrical rotating member 84 and such liner can be compressed to high radial compression ratio without disturbing the smoothness of the interface 89.

Figure 7A:
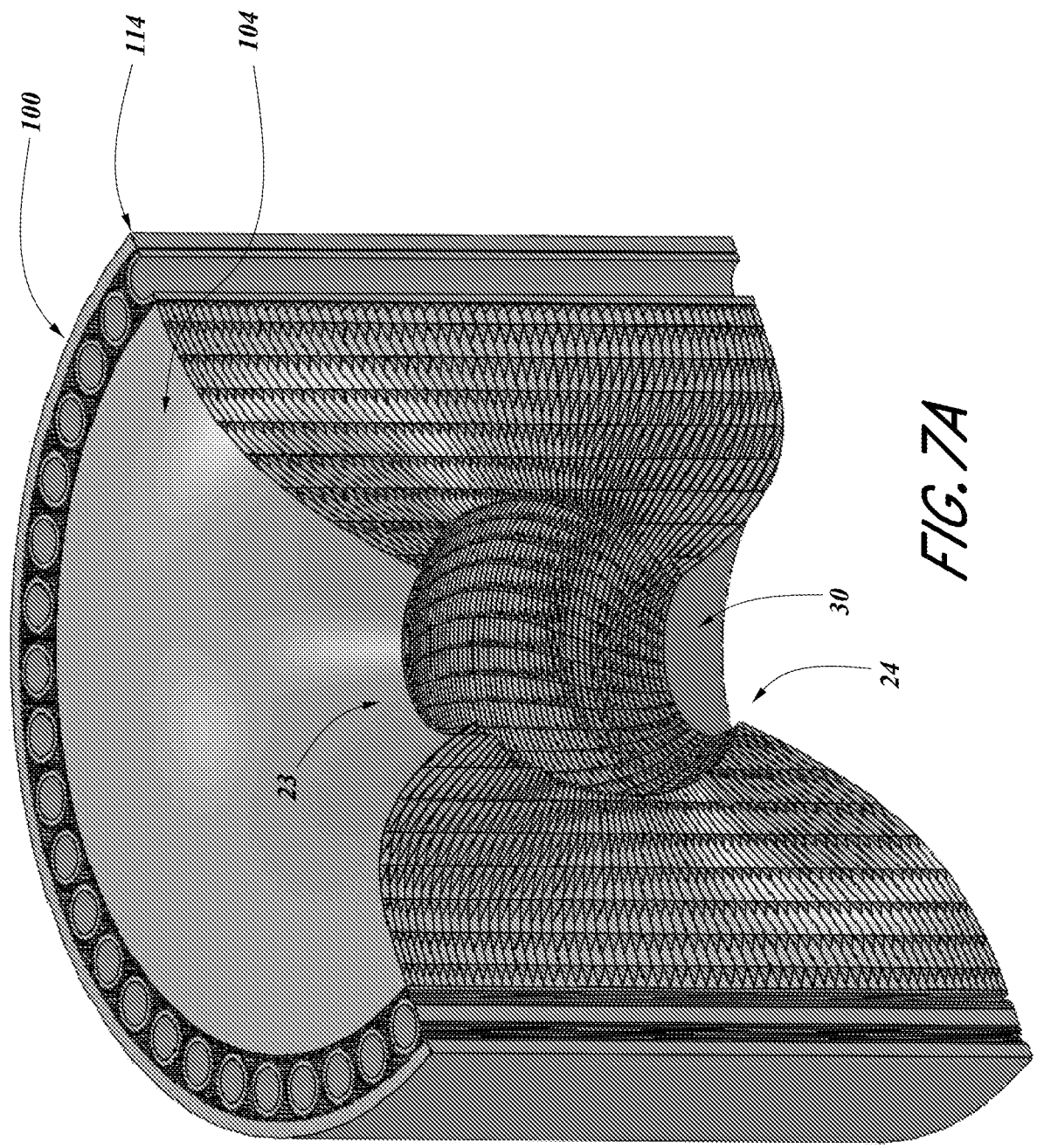
FIG. 7A is a perspective cross-sectional view of a liquid liner implosion system having an eccentric gear assembly for decelerating the rotating member.
Figure 7B:
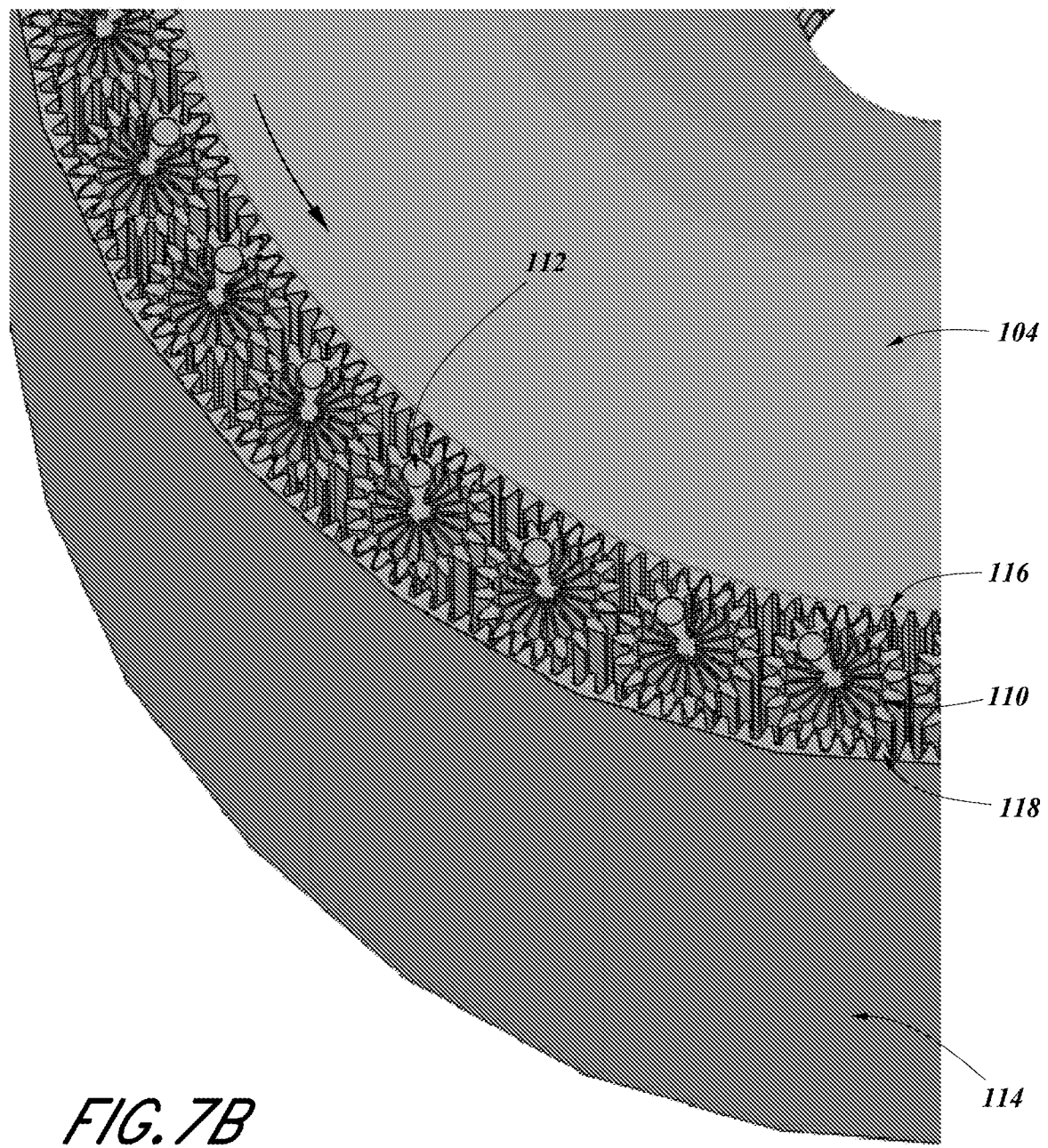
FIG. 7B is a cross-sectional detail view of some of the eccentric gears of the eccentric gear assembly.

FIGS. 7A and 7B illustrate one example of an implosion driver that comprises a means for decelerating an embodiment of rotating member referenced as 104. The rotating member 104 can have a cylindrical outer wall as the rotating member of FIG. 3 or can have a slightly curved (oblate) outer wall. In the illustrated example, the means for decelerating comprises an eccentric gear assembly 100. The eccentric gear assembly 100 comprises a plurality of planetary gears 110 each with an eccentric mass 112, and a toothed hollow gear ring 114 with teeth 118.

The rotating member 104 is provided with teeth 116 around its outer surface. The planetary gears 110 are positioned between the rotating member 104 and the hollow gear ring 114 such that some of the teeth of the planetary gears 110 engage some of the teeth 116 of the rotating member 104 and some of the teeth 118 of the gear ring 114. The eccentric gear assembly 100 can further comprise a lock (not shown) configured to lock each of the planetary gears 110 in a locked position at least at the beginning of operation. When the planetary gears 110 are in the locked position, the eccentric mass 112 is in proximity to and eccentric of the teeth 116 of the rotating member 104 such that the stress on the gear assembly 100 during rotation is minimal. As illustrated, the eccentric mass 112 is aligned slightly in the direction of the system rotation (counterclockwise in this example) when the planetary gears 110 are in the locked position, so that when the planetary gears 110 are unlocked they swing counterclockwise. The gear ring 114 and the planetary gears 112 rotate together with the rotating member 104 when the planetary gears 110 are in the locked position. When deceleration of the rotating member is desired, the lock on the planetary gears 110 is released and the planetary gears 110 spin, due to the centripetal force applied to the eccentric mass 112, thus accelerating the hollow gear ring 114 in the direction of rotation of the planetary gears 110, while decelerating the rotating member 104. The angular momentum from the rotating member 104 is thus transferred to the hollow gear ring 114. Due to such deceleration of the rotating member 104 the liquid liner formed during the rotation is imploded. This can provide energy recovery such that when the planetary gears 110 swing back they accelerate the rotating member 104 while decelerating the gear ring 114. When the planetary gears 110 swing back, they can be caught with a latch (not shown) and can be locked again in its initial position. The planetary gears 110 are swung past the contact with the teeth 116 prior to latching and locking in the locked position. Thus, when the planetary gears 110 are released, they swing outward thereby slowing the rotating member 104 and accelerating the ring 114 (deceleration of the rotating member 104). As the eccentric mass 112 swings past the point beside the gear ring 114, the planetary gears 110 accelerate the rotating member 104 and decelerate the gear ring 114 (acceleration of the rotating member 104). The planetary gear starts to slow down on the back swing and eventually stops before it gets to the point beside the rotating member 104. When the planetary gears 110 get to the point besides the rotating member 104, they can be pushed using a supplemental motor (not shown) past the contact with the teeth 116 and then lock. Otherwise, the centripetal force can cause the planetary gear 110 to reverse course, swinging back (clockwise) while accelerating the rotating member 104 and decelerating the gear ring 114 until past the point beside the gear ring 114 and then decelerating the rotating member 104 and accelerating the gear ring 114 until it stops at the point beside the rotating member 104, where it is locked. The size of the planetary gears 110, the size of the rotating member 104 and the size of the gear ring 114 can be adjusted and pre-determined such that the time when the planetary gear swings back and accelerates the rotating member 104 coincides with a maximum desired implosion of the liquid liner. The number of the planetary gears 110 and the size of such gears as well as the size of the rotating member 104 and the gear ring 114 are pre-determined to reduce the stress on the structure while achieving a desired deceleration and corresponding compression. For example, a smaller diameter of planetary gears 110 with bigger teeth is expected to provide better results in terms of yield and deceleration time.

Figure 8:
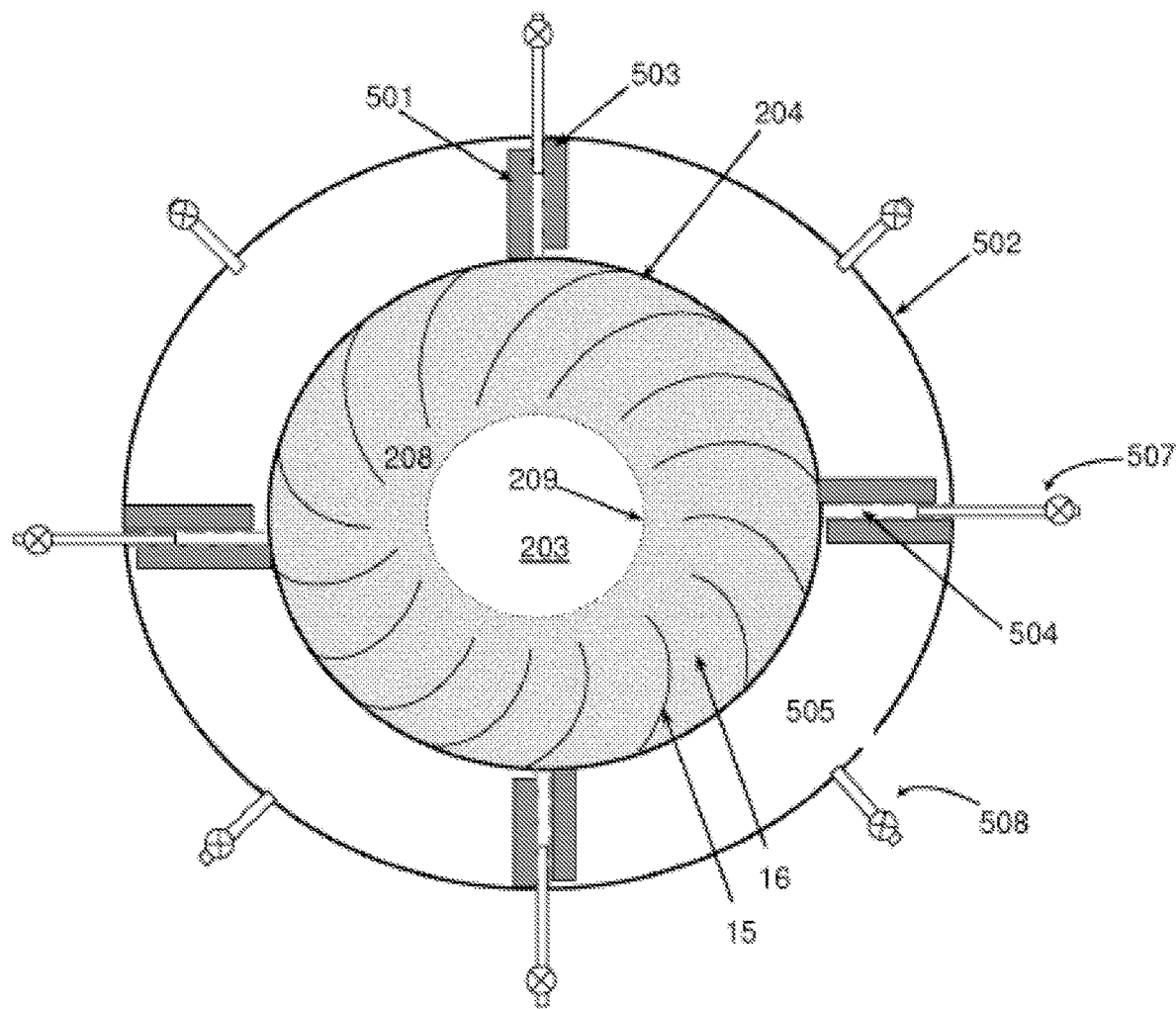
FIG. 8 is a top cross-sectional schematic view of an example of a liquid liner implosion system showing an example of a braking system for abrupt deceleration/acceleration of a rotating member.

FIG. 8 schematically illustrates another example of the means for decelerating the rotating member 204. For example, the rotating member 204 can spin with some pre-determined speed to form the liner 208 with the rotating interface 209. Then, the rotating member 204 can be suddenly accelerated and then decelerated to launch the liquid liner 208 inward collapsing the cavity 203. For example, sudden (abrupt) acceleration of the rotating member 204 can be done by using a chemical driver, pneumatic/hydraulic driver, electromagnetic driver or any other suitable means for acceleration. The acceleration phase adds momentum to the rotating member 204, and is followed with a deceleration phase in order to implode the liquid liner inwardly. As illustrated, the rotating member 204 is placed within a vessel 502, such that the vessel 502 can rotate together with the rotating member 204 at the formation speed to form the liquid liner 208. The vessel 502 has a number of tabs 503 connected to its inner wall such that the tabs 503 extend inwardly from the wall of the vessel 502 toward the rotating member 204. The rotating member 204 comprises corresponding tabs 501 that are connected at its outer wall and extend outwardly toward the vessel 502 such that each of the tabs 501 and 503 form a pair of facing tabs with a spacing gap 504 therein between. Means for accelerating 507 can be configured to apply pressure in the gap 504 to push apart the two facing tabs 501, 503, thus accelerating the vessel 502 and the rotating member 204 in opposite directions. For example, the accelerating means can comprise a source of pressurized gas and a fast valve to inject a compressed gas into the gaps 504 to suddenly accelerate the vessel 502 and the rotating member 204. As the vessel 502 and the rotating member 204 accelerate in opposite directions their respective tabs 501, 503 will approach/impact the respective approaching neighboring tabs. To avoid having the tabs 501, 503 collide, the vessel 502 and the rotating member 204 can be decelerated using decelerating means 508. The decelerating means 508 can be, for example, another fluid source and a fast valve for injecting a fluid into a space 505 formed between two neighboring spacing gaps 504, so that as the vessel 502 and the rotating member 204 accelerate in opposite directions they compress the fluid injected in the space 505 causing them to decelerate and launch the liquid liner 208 inwardly collapsing the central cavity 203.

In one implementation, the implosion driver can comprise only means for rapid (abrupt) acceleration and the deceleration means can be omitted. By abrupt acceleration of the rotating member the liquid medium will be pushed in a direction determined by the shape (direction) of the blades 15. Person skilled in the art would understand that any other means for accelerating or decelerating the rotating member can be used without departing from the scope of invention. For example, a pancake coil can be used for fast acceleration of the rotating member, or one or more additional coils can be used to provide a magnetic field to decelerate the rotating member. In one implementation, more than one means for acceleration/deceleration can be used. For example, one decelerator/accelerator can be used to slightly change the speed of the rotating member such that the liquid medium trapped in the passages 16 can move slightly inward from the inner surface of the rotating member, smoothening the step-like interface of the liquid liner. Then the second decelerator/accelerator can be applied to fully implode the liquid liner toward the central region and collapse the cavity.

In one implementation, the implosion driver can comprise a fluid source so that a fluid that can be injected at the outer surface of the rotating member to decelerate the rotating member. For example, a fluid, e.g. a compressed gas or a liquid medium under pressure, can be injected at the outer surface of the rotating member through a plurality of valves. The plurality of valves can be in fluid communication with a fluid source (not shown), so that when the valves are opened, the fluid (e.g. the compressed gas) can be injected at the outer surface of the rotating member to decelerate it. In another implementation, the pressurized fluid can be used to accelerate the rotating member and push the liquid liner inwardly. For example, the outboard end of the blades 15 can be shaped to form a cup such that when a pressurized fluid is injected in such cup the force of the pressurized fluid accelerates the rotating member and pushes the liquid down the vanes/passages 16. The liquid liner will be launched inwardly due to the sudden acceleration of the rotating member and the force applied by the pressurized gas to the liquid in the vanes/passages 16. Persons skilled in the art would understand that the blades can be shaped such that by injecting the pressurized fluid therein the rotating member would be decelerated (e.g. inverted cup). Thus, the pressurized fluid can be used to decelerate or accelerate the rotating member depending on the blade shape compared to the direction of the rotation.

Figure 9:
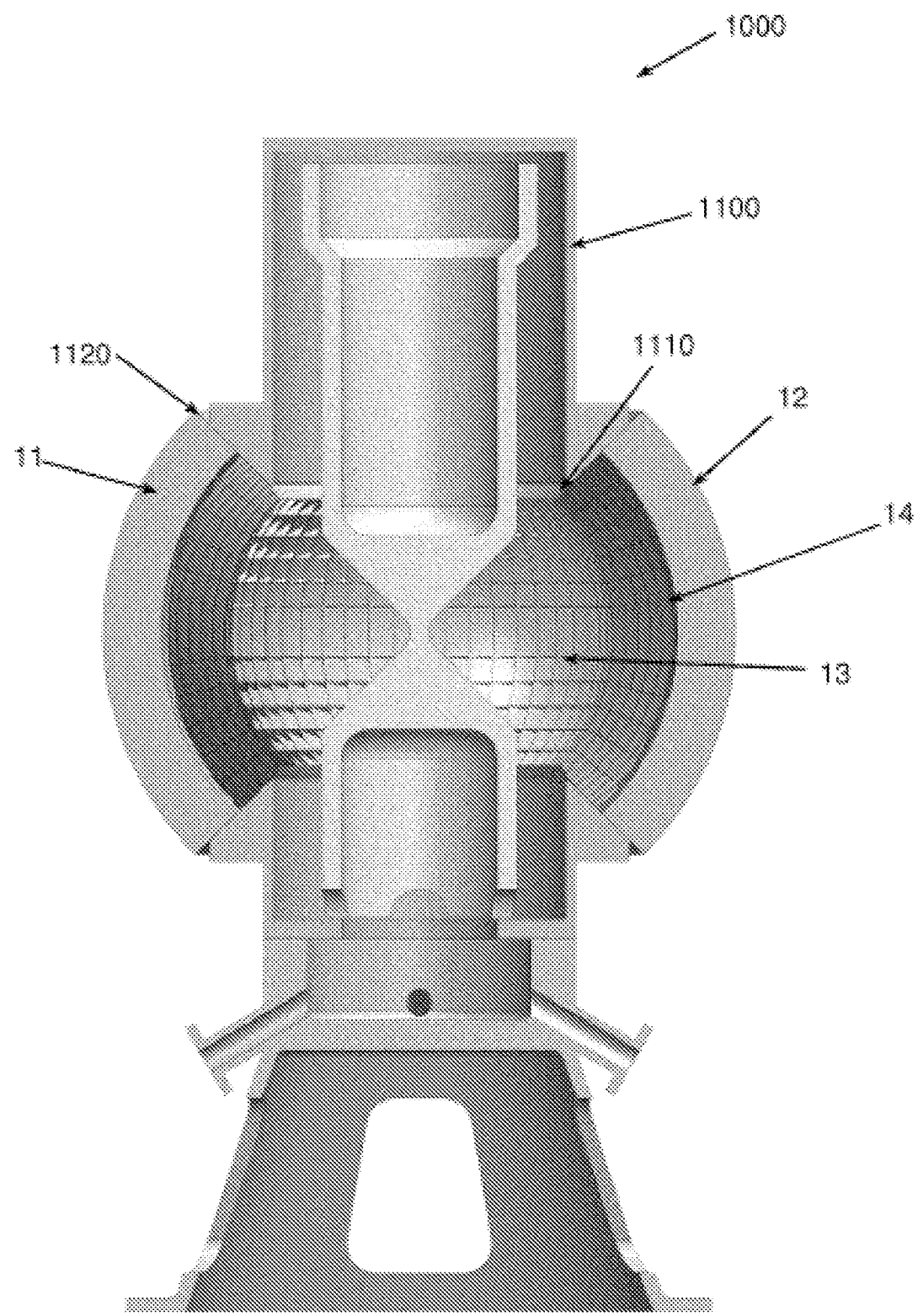
FIG. 9 is a schematic cross-sectional view of an example of a plasma compression system using a liquid liner implosion system to compress plasma.

The systems for imploding the liquid liner in both the axial and radial directions, as described herein above, can be used in plasma compression systems for compressing plasma. The plasma compression system comprises a plasma generator to generate plasma and inject such plasma into an evacuated cavity formed within a liquid liner, and a liquid liner implosion system to implode the liquid liner inwardly towards a central region of the evacuated cavity to compress the plasma trapped therein. Person skilled in the art would understand that any of the embodiments of a system for forming and imploding a liquid liner as described herein, or any combinations thereof, can be used for imploding a liquid liner in the radial and axial directions and for compressing the plasma trapped within the imploding liquid liner. FIG. 9 illustrates an example of a plasma compression system 1000 that comprises a plasma generator 1100 which is configured to generate plasma and inject such plasma into the cavity 13 formed in the rotating member 14. The rotating member 14 can be any of the embodiments described herein above or combination thereof. The plasma can be magnetized plasma, such as for example a compact toroid (CT). An outlet 1110 of the plasma generator 1100 is aligned with an annular opening 1120 formed in the wall 11 of the vessel 12 and with the entrance opening 30 (see FIG. 7A) of the rotating member 14, so that the plasma is injected into the evacuated cavity 13. When the rotating member 14 is abruptly decelerated/accelerated, the liquid liner implodes and collapses the cavity 13 thereby compressing the plasma trapped therein.

The systems for imploding a liquid liner illustrated in any of the FIGS. 1-9 are vertically oriented, however persons skilled in the art would understand that such systems can be in horizontal orientation or tilted at an angle without departing from the scope of invention.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

What is claimed is:

1. A liquid liner implosion system for forming a cavity in a liquid liner and collapsing the cavity by imploding the liquid liner, the system comprising:
   (a) a vessel having an outer wall;
   (b) a rotating member inside the vessel and rotatable about a rotation axis, the rotating member comprising a first end and a second end along the rotation axis;
      an inner surface defining an interior volume and curving with respect to the axis of rotation; and
      a plurality of curved passages each having an inboard opening at the inner surface and an outboard end, wherein a curvature of each passage is a function of a distance between the outboard end of the passage and the first or the second end, and wherein one or more of the passages have an outboard end in a vicinity of the first or second end and curves in three dimensions from the outboard end to the inboard opening in a direction towards a central region of the interior volume;
   (c) a rotational driver operationally coupled to the rotating member to rotate the rotating member;
   (d) a liquid medium in the rotating member, the liquid medium at least partially filling the curved passages and forming a liquid liner when the rotating member is rotating, an inner interface of the liquid liner defining a cavity coaxial with the rotation axis; and
   (e) an implosion driver engageable with the rotating member to change the acceleration of the rotating member and cause the liquid liner to implode towards a central region of the interior volume, thereby collapsing the cavity.

2. The system of claim 1 wherein the rotating member comprises a plurality of shaped blades spaced apart to form the plurality of curved passages.

3. The system of claim 2, wherein at least some of the plurality of shaped blades have tapered walls at the inboard openings.

4. The system of claim 1, wherein the inner surface of the rotating member curves inwardly towards each of the first end and the second end.

5. The system of claim 4, wherein volumes of at least two of the plurality of curved passages are different, with the volume of one or more of the curved passages with an outboard end closer to the first or second end being smaller than the volume of one or more of the curved passages with an outboard end further away from the first or second end.

6. The system of claim 5, wherein the volume of each passage increases as its outboard end is located further away from the first and the second ends.

7. The system of claim 4, wherein the passages having outboard ends closer to the first or the second ends are one or more of narrower, longer and more twisted than the passages having outboard ends further away from the first or the second ends.

8. The system of claim 1, wherein the outboard ends of the plurality of curved passages each further comprise an outboard opening at an outer surface of the rotating member.

9. The system of claim 8, wherein a shape of the outer surface of the rotating member is determined according to an equation $$P_{out(top)} + \rho g(z_o - z) = P_{in} + \rho \omega^2 \int_{ri(z)}^{ro(z)} r\,dr$$

where $P_{out(top)}$ is a pressure at the outer surface at the first end of the rotating member; $Pi_{in}$ is a pressure at the inner surface of the rotating member; $z_o$ is a reference point at the inner surface; z is a variable distance along the axis of rotation; $\rho$ is a density of the liquid medium; g is an acceleration due to gravity along the rotation axis of the rotating member; $\omega$ is rotational speed in rad/s of the rotating member; r is a variable perpendicular distance from the rotation axis; $r_o(z)$ is a function defining a radius of the outboard opening of each of the passages from the rotation axis and $r_i(z)$ is a function defining a radius of the inboard opening of each of the passages from the rotation axis.

10. The system of claim 4, wherein when the first end of the rotating member is above the second end, the rotating member is asymmetric about an equatorial plane such that a difference between a radius of the outboard opening from the axis of rotation and a radius of the inboard opening from the axis of rotation ($\Delta r$) at the first end is smaller than the $\Delta r$ at the second end.

11. The system of claim 1, wherein the rotating member comprises two or more parts that are spaced along the rotation axis and interlocked together.

12. The system of claim 11, wherein each of the parts of the rotating member are independently connected to the rotational driver and the implosion driver.

13. The system of claim 1, wherein the implosion driver includes a decelerator comprising an eccentric gear assembly having a toothed hollow gear ring and a plurality of planetary gears each having a plurality of teeth at its circumference, the plurality of planetary gears positioned between the rotating member and the gear ring, the rotating member comprising teeth projecting toward the planetary gears such that at least some of the teeth of the planetary gears engage at least some of the teeth of the rotating member and at least some of the teeth of the gear ring, each of the planetary gears further comprising an eccentric mass, the eccentric gear assembly further comprising a lock configured to lock the planetary gears in a locked position relative to the rotating member at a beginning of an operation, the eccentric mass of each planetary gear being offset with respect to the rotating member when in the locked position, whereby when the lock is released the planetary gears spin in the direction of rotation, decelerates the rotating member and accelerates the hollow gear ring.

14. The system of claim 13, further comprising a planetary gear driver operationally coupled to the planetary gear assembly to drive the plurality of planetary gears such that the eccentric mass in each planetary gear is brought to an initial position.

15. The system of claim 1, wherein the implosion driver includes an accelerator selected from a group consisting of a chemical driver, an electromagnetic driver, a pneumatic driver, a hydraulic driver, or a combination thereof.

16. The system of claim 15, wherein the vessel comprises tabs extending inwardly from the outer wall toward the rotating member and the rotating member comprises corresponding tabs extending outwardly from a closed outer wall of the rotating member toward the vessel, the tabs of the vessel and the corresponding tabs of the rotating member forming pairs of facing tabs with a spacing gap therein between, the accelerator configured to provide a pushing force in the spacing gap to push apart the facing tabs, thereby accelerating the rotating member and the vessel in opposite directions.

17. The system of claim 16, wherein the accelerator comprises at least one valve and a source of a pressurized fluid in communication with the at least one valve, the pressurized fluid being injectable into the spacing gap through the at least one valve.

18. The system of claim 2, wherein the outboard ends of the plurality of curved passages each further comprise an outboard opening in an outer surface of the rotating member, and wherein the blades at the outbound openings of the rotating member are cup-shaped, the implosion driver comprises a pressurized fluid source and valves in communication with the pressurized fluid source such that when the valves are opened a pressurized fluid is injected into the cup-shaped outboard ends of the blades thereby changing the rotational speed of the rotating member.

19. A plasma compression system comprising:
the liquid liner implosion system of claim 1, wherein the vessel further comprises an opening in the outer wall, and wherein the rotating member further comprises an entrance opening at one of the first end or the second end, the entrance opening in fluid communication with the interior volume and the inboard openings of the plurality of curved passages; and
a plasma generator configured to generate plasma and having an outlet connected to the opening in the outer wall of the vessel and aligned with the entrance opening of the rotating member such that plasma generated being injectable into the cavity, whereby the imploding liquid liner collapses the cavity and compresses the plasma trapped therein.

* * * * *

UNITED STATES PATENT AND TRADEMARK OFFICE
CERTIFICATE OF CORRECTION

PATENT NO. : 11,064,601 B2  
APPLICATION NO. : 16/634129  
DATED : July 13, 2021  
INVENTOR(S) : Zimmermann et al.

Page 1 of 1

It is certified that error appears in the above-identified patent and that said Letters Patent is hereby corrected as shown below:

In the Specification

In Column 4, Line 37, delete "r" and insert --$r_i$--.

In the Claims

In Column 14, Line 24 (approx.), Claim 9, delete "$Pi_{in}$" and insert --$P_{in}$--.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*